Aug. 18, 1959 F. E. SINGELMAN 2,900,598

METHOD AND APPARATUS FOR TESTING TELEVISION RECEIVERS

Filed Nov. 30, 1956

INVENTOR.
Fred E. Singelman
BY J. D. Douglas
HIS ATTORNEY

United States Patent Office 2,900,598

Patented Aug. 18, 1959

2,900,598

METHOD AND APPARATUS FOR TESTING TELEVISION RECEIVERS

Fred E. Singelman, Palatine, Ill., assignor to Admiral Corporation, Chicago, Ill., a corporation of Delaware Application November 30, 1956, Serial No. 625,517

9 Claims. (Cl. 324—72)

This invention relates to improvements in testing devices, and more particularly to an improved tester for alignment of television receivers.

In the production of television receivers it is customary, after all of the circuitry is in place, to align and adjust the receiver with the picture tube in place in the chassis. This is normally considered the last step of work on the chassis before it is installed in the television cabinet and constitutes a visual check of the raster for size, shape, horizontal and vertical linearity, the manner in which the synchronizing, width, height and hold controls perform, and any other visual checks necessary to determine if the receiver is properly operating.

So long as television receivers used small picture tubes this entailed no great difficulty, because the tubes were fastened to the chassis and actually could be considered as an integral part therewith.

The above entailed some difficulties, however, because the tubes are normally made of glass, highly evacuated and were subject to implode. The necks of the tubes in particular were fragile. Sometimes these tubes implode for no apparent reason. Other times they implode because of rough handling. The imploding of a tube was dangerous to the workers for although ordinarily they are properly protected by gloves, aprons and suitable goggles, the glass flew for great distances and caused injury to people not so protected as well as shock due to the sound of the implosion.

By my present invention the chassis can be completed and tested without the installation of the picture tube, thus eliminating the chance of breakage and making the chassis much easier to handle because it is less cumbersome and considerably lighter in weight.

With the advent of larger television picture tubes, particularly those known as 21 inch, 24 inch and larger, it became desirable to mount the picture tube in the cabing separately from the chassis, no provision being made for mounting the tube on the chassis. Although suitable jigs could be provided for temporary support of the tube on the chassis, these were not desirable because they were cumbersome and also because they required a separate assembly and disassembling operation which were costly. Furthermore, although the final stages of adjustment could be completed in the cabinet this was undesirable because frequently certain parts had to be changed in order to make a proper adjustment which meant taking the chassis from the cabinet. In addition the adjustment in the cabinet was much more difficult than it was when performed out of the cabinet.

Briefly, the invention includes the use of a probe that may be inserted in the deflection yoke of the television receiver and which has pickup coils therein which may be connected to an ordinary cathode ray oscilloscope, and the raster is presented on the face of the cathode ray tube in the oscilloscope enabling all of the usual adjustments to be made.

Another aspect of the invention includes the provision of means to cause the cathode ray beam of the oscilloscope to sweep the screen in the absence of a signal on the probe and thus prevent the beam from burning the screen as it would do when at rest.

Still other advantages of the invention, and the invention itself, will become more apparent from the following description of an embodiment thereof which description is illustrated by the accompanying drawings, and forms a part of the specification.

Figures 1, 2, 3:
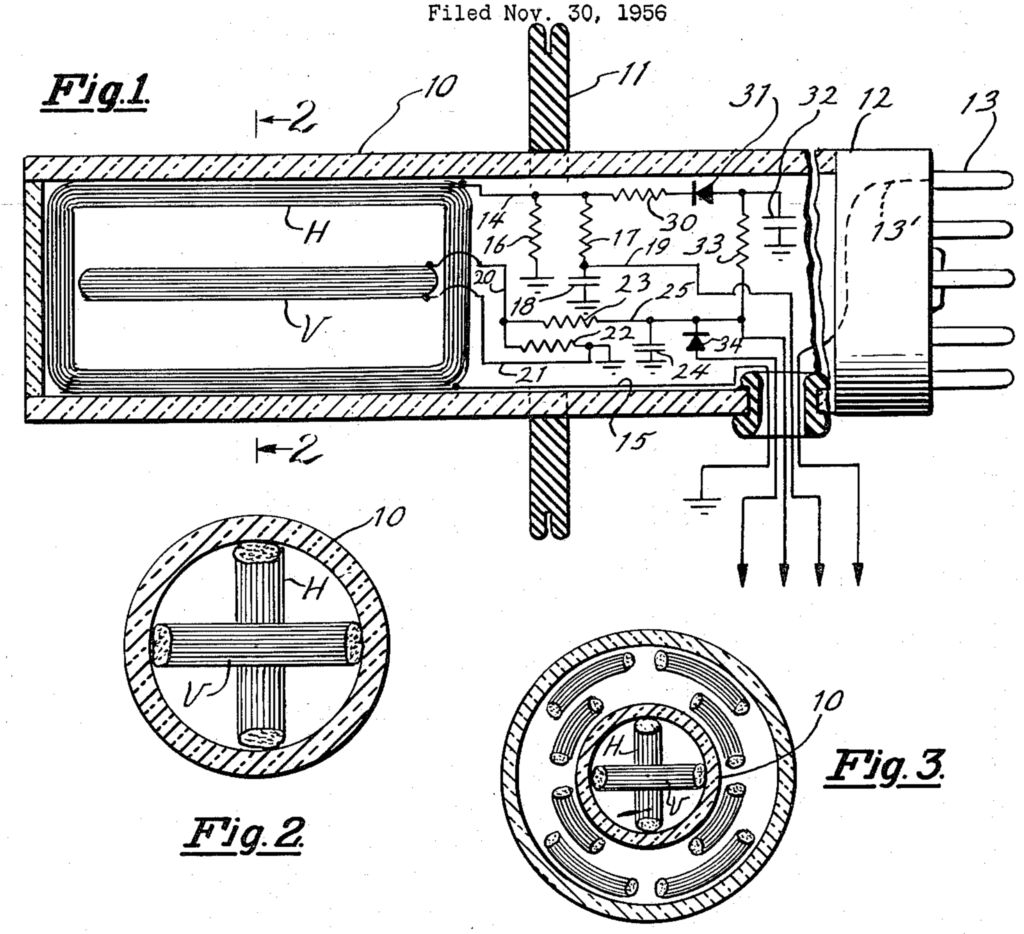
Fig. 1 is a view of a probe constructed according to my invention with portions broken away to illustrate the invention.
Fig. 2 is a section taken on the line 2—2 of Fig. 1.
Fig. 3 is a transverse section taken through the probe at the point 2—2 and showing it in position in a television receiver yoke which is also shown in section.

Referring now to the drawings, throughout which like parts are designated by like reference characters, the probe includes a housing 10 of cylindrical formation having a diameter at least equal to that of the neck of a television tube and approximately the inside diameter of the deflection yoke used on television receivers. Unequally spaced from the ends of the yoke is a flange 11. This flange may be integral with the housing or a separate element movable along the housing to adjusted positions. Inside of the tube there are disposed two coils which are at right angles to each other. The coil H, and which is of generally rectangular formation, consists of a small number of turns of wire, which are secured together as a unit and of a size that provides a close fit with the tube. The coil may be held in the probe in any apparent manner such as cementing by a plastic cement.

Inwardly of the coil H and at right angles thereto is a second coil V consisting of a larger number of turns of wire formed in a similar manner and supported in a similar manner.

Figure 4:
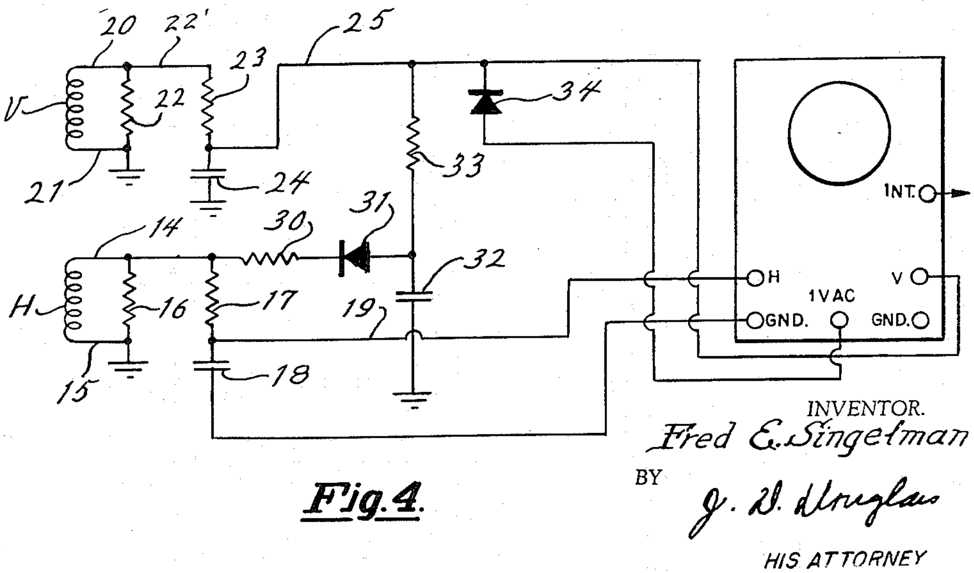
Fig. 4 is a circuit diagram of the probe and its manner of connection to a cathode ray oscilloscope.

As can be seen from Fig. 1 and also Fig. 4, the winding H has leads 14 and 15, lead 15 being grounded and a resistor 16, which is the usual damping resistor, shunting the lead 14 to ground. Also, across this circuit is the resistor 17 and condenser 18 in series and with the condenser connected to ground. This is an integrating network, the signal being taken off at the junction of resistor 17 and condenser 18 by a lead 19 which contains the horizontal sweep signal that is applied to the horizontal input circuit of a cathode ray oscilloscope.

The vertical winding V likewise has lead 20—21, the lead 21 being grounded and the coil being shunted by the damping resistor 22. The lead 20 connects to an integrating circuit comprising the series connected resistor 23 and condenser 24, the output being taken by the lead 25 from this circuit for application to the vertical input circuit of the oscilloscope.

Thus by connecting the output of the probe to the vertical and horizontal input circuits of the oscilloscope a raster may be produced which is identical with that produced on the usual picture tube except for size and whereby all the defects or the correctness of operation may be observed and the various adjustments made on the receiver for correct operation.

If desired, the probe may be provided with plug 12 having the usual pin terminals such as 13, one of which is preferably connected to a wire 13', whereby the socket for the picture tube may be connected and the terminal 13 used to pick up the picture modulation which may be applied to the beam intensity control "int" of the oscilloscope in order that a picture may be viewed on the oscilloscope.

It will be appreciated that should the probe be removed from the yoke of the receiver or the receiver deenergized there would be no signal in the probe with the result that a spot would appear on the screen of the oscilloscope which would be of such intensity that it would burn the phosphor. Therefore, I provide means such that when the probe is removed and/or the set turned off the spot is made to traverse the screen preventing such burning. As can best be seen from Fig. 4, a portion of the signal is rectified by connecting an isolating resistor 30 to the lead 14 in series with a rectifier 31, and filtered by a condenser 32 to provide a direct current voltage which is connected through an isolating resistor 33 to the vertical output lead 25. At the same time an A.C. voltage is fed from a suitable source, 1 v. A.C. which may be obtained from the usual calibrating voltage source of the oscilloscope and usually is 1 volt, through a diode 34 to the output lead 25 of the probe. In this instance, if no signal is being developed in the probe, the diode 34 may conduct and produce a deflection on the screen of the oscilloscope, thus preventing spot burn. When a signal is developed in the probe, however, by the diode condenser combination 31—32, it is of the proper polarity to bias the diode 34 against conduction and does not affect the signal content produced for examination purposes.

Having thus described my invention I am aware that numerous and extensive departures may be made therefrom without departing from the spirit of the invention as defined by the appended claims.

I claim:

1. An apparatus for adjusting a television receiver in the absence of a kinescope tube wherein the receiver is provided with a yoke for effecting deflections of the image producing beam which comprises a probe comprising a pair of discrete coils disposed at right angles to each other and arranged to be inserted in said yoke, one of said coils arranged to pick up energy from the horizontal deflection coils and the other from the vertical deflection coils, and connections extending from each of said coils for connection to the vertical and horizontal deflection systems of a cathode ray oscilloscope.

2. An apparatus for adjusting a television receiver in the absence of a kinescope tube wherein the receiver is provided with a yoke for effecting deflections of the image producing beam which comprises a probe comprising a housing of cylindrical formation for insertion into said yoke and having a flange on the housing for engagement with the end of the yoke, the diameter of the housing being such as to provide a close sliding fit with the interior of the yoke, a pair of induction pickup coils supported in said housing, one of said coils being arranged to be aligned with the vertical deflection coils of the yoke and to pick up energy therefrom, the other of said coils being disposed for simultaneous alignment with the horizontal deflection coils for picking up energy therefrom and said flange being so positioned on the housing that when it abuts the yoke the coils are arranged to provide the desirable pick up of energy from the yoke, and leads extending from said coils and connected to the vertical and horizontal deflection systems of a cathode ray oscilloscope to produce a raster thereon controlled by the energy picked up by said probe.

3. An apparatus for determining the wave form and signal voltages present in the yoke of a television receiver in the absence of a picture tube, which comprises a probe having separate pickup coils therein arranged to be inserted in the yoke and develop signals in the coils as a result of their proximity to the coils of the yoke in the presence of signals in the yoke, and a cathode ray oscilloscope having horizontal and vertical deflection circuits for deflecting a cathode ray beam across a screen, each one of said deflection circuits being connected to opposite ones of said coils.

4. An apparatus as described in claim 3 wherein an independent source of signal is provided and is connected to one of said deflection circuits to cause said beam of the cathode ray oscilloscope to move independently of the signal in the probe.

5. An apparatus as described in claim 4 wherein means is provided for developing a voltage in said probe in the presence of said signal and means connecting said voltage developing means to the independent signal source to disable the signal source.

6. An apparatus for analyzing a circuit including a pickup probe for connection to the circuit under test arranged to develop horizontal and vertical sweep signals and a cathode ray oscilloscope having a screen and having the horizontal and vertical signal responsive circuits connected to said probe, means to cause periodic deflections of the cathode ray beam across said screen in the absence of a signal comprising a source of constantly varying signal voltage connected to one of said deflection systems and means in said probe to develop a counteracting voltage to overcome said signal source in the presence of a signal on the probe.

7. An apparatus for testing a television receiver circuit in the absence of the picture tube which comprises a probe having discrete pickup coils therein arranged to be energized by voltages present in the horizontal and vertical deflection coils of the yoke, a cathode ray oscilloscope having horizontal and vertical deflection circuits connected to said coils in the probe for deflecting the beam of the oscilloscope, a source of varying voltage, a diode connecting said source of voltage to one of the deflection circuits of the oscilloscope, and means in said probe for developing a bias voltage in the presence of a signal in the probe connected to said diode to bias said diode against conduction.

8. Apparatus as described in claim 7 wherein the means for developing the bias voltage is a rectifier circuit.

9. A circuit analyzer including a probe adapted to extract signals from a circuit under examination, a cathode ray oscilloscope connected to said probe for providing an indication on its screen of the signal produced in the probe, means to cause the cathode ray beam to be continuously moving on the screen in the absence of a signal on the probe which includes a signal source, unilateral conducting means connected to said signal source and at least one of the sweep circuits in the cathode ray oscilloscope, and means in said probe for developing a voltage in the presence of a signal on the probe connected to said unilateral conducting means to condition said conducting means against conduction.

References Cited in the file of this patent

UNITED STATES PATENTS

| | | |
|---|---|---|
| 2,338,245 | Hays | Jan. 4, 1944 |
| 2,557,761 | Powell | June 19, 1951 |
| 2,621,514 | Waugh | Dec. 16, 1952 |
| 2,684,455 | McComas | July 20, 1954 |

OTHER REFERENCES

"Electronics," July 1953, page 291.